United States Patent
Fox

(10) Patent No.: US 7,280,726 B2
(45) Date of Patent: Oct. 9, 2007

(54) CONTROLLED-INTENSITY MULTIPLE-FREQUENCY MULTIPLE-AXIS ILLUMINATION OF MACROSCOPIC SPECIMENS FROM A SINGLE LIGHT SOURCE USING SPECIAL BIFURCATED CABLES

(76) Inventor: John S. Fox, 684 Poinsettia Park South, Encinitas, CA (US) 92024

( * ) Notice: Subject to any disclaimer, the term of this patent is extended or adjusted under 35 U.S.C. 154(b) by 0 days.

(21) Appl. No.: 10/788,724

(22) Filed: Feb. 26, 2004

(65) Prior Publication Data
US 2005/0191015 A1  Sep. 1, 2005

(51) Int. Cl.
*G02B 6/44*  (2006.01)
(52) U.S. Cl. .................. 385/104; 385/111; 385/901
(58) Field of Classification Search ........ 362/227–252; 385/104, 111, 115, 116, 901
See application file for complete search history.

(56) References Cited

U.S. PATENT DOCUMENTS

| | | | | |
|---|---|---|---|---|
| 5,031,078 A | * | 7/1991 | Bornhorst | 362/552 |
| 5,217,285 A | * | 6/1993 | Sopori | 362/1 |
| 6,402,358 B1 | * | 6/2002 | Larimer | 362/575 |
| 6,883,952 B2 | * | 4/2005 | Sander | 362/575 |
| 6,894,289 B2 | * | 5/2005 | Nilson et al. | 250/458.1 |
| 2003/0123261 A1 | * | 7/2003 | Muthu et al. | 362/555 |
| 2004/0090671 A1 | * | 5/2004 | Gilbert | 359/391 |
| 2005/0211912 A1 | * | 9/2005 | Fox | 250/458.1 |
| 2006/0203244 A1 | * | 9/2006 | Nilson et al. | 356/417 |

* cited by examiner

*Primary Examiner*—Frank G. Font
*Assistant Examiner*—Charlie Peng

(57) ABSTRACT

In one embodiment a macroscopically-sized specimen is illuminated with radiations of selectable multiple intensities and frequencies for viewing along a single viewing axis. A stage supports specimen to be observed. First and second illumination sources provide respective first and second radiations at predetermined different colors, permissively of different intensities. A special "bifurcated" fiber optic cable receives the first radiation into a first one of two radiation-receiving, or input, ends, and the second radiation into a second one of two radiation-receiving, or input, ends, so as to produce at each of at least two radiation-emitting, or output, ends an illuminating beam in which the first and the second radiations are mixed. The intensities and colors of both radiations are controllable. The multi-color controlled-intensity radiation beams are particularly useful for excitation of multiple different fluorescent agents, and differently fluorescing regions, within a biological specimen such as, by way of example, a tumorous mouse.

24 Claims, 2 Drawing Sheets

FIG. 2a
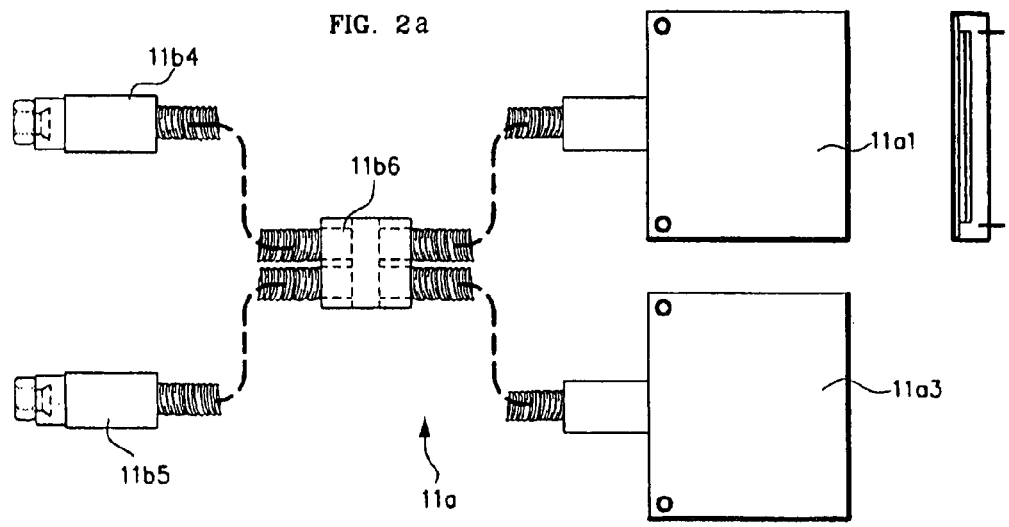
FIG. 2b
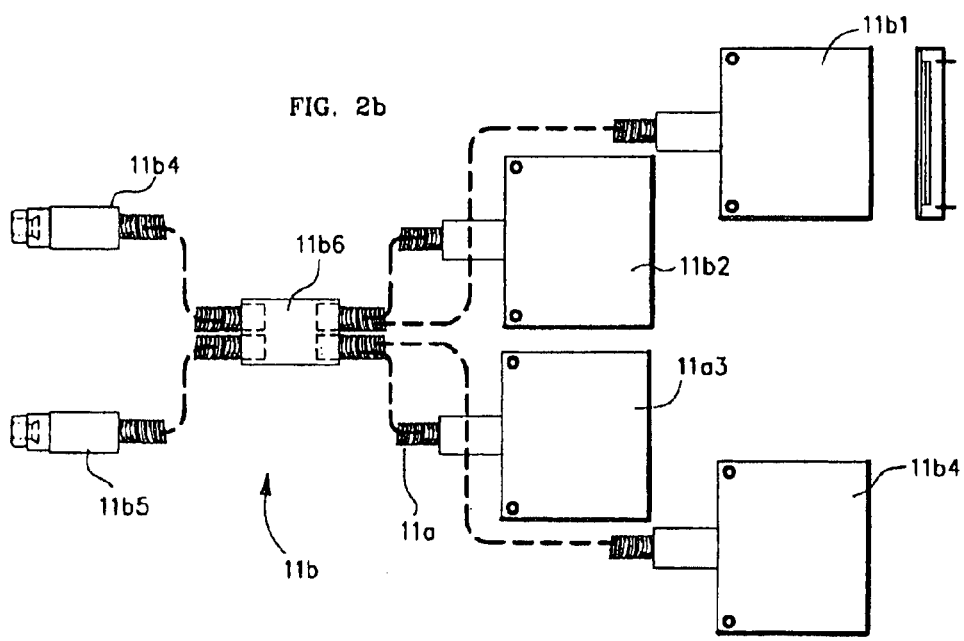
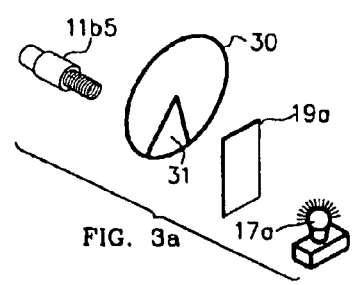
FIG. 3a
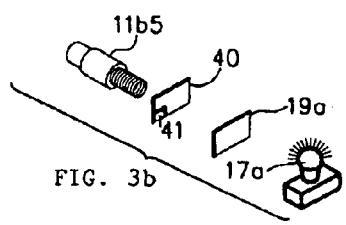
FIG. 3b

CONTROLLED-INTENSITY MULTIPLE-FREQUENCY MULTIPLE-AXIS ILLUMINATION OF MACROSCOPIC SPECIMENS FROM A SINGLE LIGHT SOURCE USING SPECIAL BIFURCATED CABLES

REFERENCE TO RELATED PATENT APPLICATIONS

The present patent application is related to U.S. patent application Ser. No. 10/810,993 (now U.S. Pat. No. 7,173,256) for a FLUORESCENT IMAGE CALIBRATION STEP WEDGE, AND USE THEREOF IN ILLUMINATION FOR FLUORESCENT IMAGING AND AUTOMATIC EXPOSURE. The present patent application is also related to U.S. patent application Ser. No. 10/775,792 for ILLUMINATING AND PANORAMICALLY VIEWING A MACROSCOPICALLY-SIZED SPECIMEN ALONG A SINGLE VIEWING AXIS AT A SINGLE TIME. Both related patent applications are to the selfsame John Fox who is the inventor of the present application. The contents of the related patent applications are incorporated herein by reference.

BACKGROUND OF THE INVENTION

1. Field of the Invention

The present invention generally concerns (1) an apparatus, as are commonly but not exclusively used in laboratories, for illuminating and for viewing a macroscopically-sized specimen, for example a mouse, along each of potentially multiple viewing axis, and (2) the methods of using such an apparatus, particularly as both apparatus and method support of illumination and viewing that is controlled in intensity, frequency (color) and the like.

The present invention particularly concerns illuminating and viewing a macroscopically-sized specimen, such as a mouse, along each of multiple viewing axis at a single time where the illumination of the specimen along each axis is in, potentially, multiple colors (i.e., wavelengths, or frequencies) as serve to excite corresponding fluorescent emissions in the specimen in each of multiple colors (i.e., wavelengths, or frequencies). Moreover, each of the potentially plural induced fluorescent emissions (along each illumination and viewing axis) may be independently controlled in intensity. In particular, multiple fluorescing colored fields as appear within a composite, panoramic, image of the specimen may be—by the adjustability of the fluorescent emissions—both (1) made clearly visible, and (2) balanced one color and area of fluorescent emission to the next—meaning that a bright field of one fluorescent color will not "swamp" a dimmer fluorescent field of another color. Moreover, and nonetheless that the induced fluorescent emissions may be adjusted in intensity—meaning that the dim may be made bright simultaneously that the bright may be made dim—the true and actual intensity of each fluorescent emission may be quantitatively known.

The present invention will be seen to still further concern that all such variable illumination along each of multiple axis as produces multi-color fluorescent emissions of controlled intensity (along each axis, as are individually visible in a composite image) is efficiently realized.

Accordingly, whereas (1) a first related invention regarding panoramic viewing may be simplistically regarded as showing how to comprehensively illuminate and view a macroscopic specimen along a single axis at a single time, and (2) a second invention regarding a fluorescent image calibration step wedge may be simplistically regarded as showing how to quantify each of multiply-colored fluorescent emissions permissively simultaneously appearing in each of multiple (illumination and) viewing axis in a composite, panoramic, image, (3) the present invention shows how efficiently illuminate a macroscopic specimen, permissively along each of multiple axis, with some sophistication to the end to that each of multiple fluorescent emissions induced in the specimen (by the illuminating) will be well and easily viewable. Specifically, the present invention will be seen to regard image illumination for viewing where such illumination is not only realized along each of multiple viewing axis at a single time, but where this axial illumination is readily selectively balanced in either of intensity (and/or, less commonly, color (i.e., wavelength, or frequency)). This selective balancing of illuminations—permissively separately independently along each of a plurality of specimen illumination paths—is so that fluorescence induced in the specimen and appearing in the composite image as different fields having more than one color (i.e., wavelengths, or frequencies) will so appear with roughly equal intensity each color.

Despite this "adjustment" in the intensities of each fluorescent color, the real and true intensity of fluorescence at each color (i.e., wavelength, or frequency), is readily calibrated for each color, and is even so calibratable separately along each illumination path.

2. Description of the Prior Art 2.1 General Laboratory Apparatus and Methods for Illumination and Observation of Macroscopically Sized Specimens Apparatus to illuminate and to hold macroscopically-sized specimens for viewing, including viewing as may involve the taking of photographs, are known in the art. These apparatus hold secure a macroscopically-sized specimen to be viewed, including for example a live specimen and more particularly a laboratory animal and still more particularly a mouse, upon a specimen stage. A source of illuminating radiation—most commonly a narrowband, colored, light radiation—is brought to bear upon the held specimen.

The illuminating radiation sources may consist of the emitting end of a fiber optic, a fiber optic bundle, or a light pipe or the like. The illuminating radiation itself may, by way of example, be sufficient so as to induce fluorescence in the specimen, including in a specimen as may have been previously fused with fluorescing agents that most commonly serve to make regions of the specimen that are of interest more visible or otherwise detectable.

The illuminated specimen may be, and commonly is, digitally imaged, but may also and/or alternatively be photographed, including in its emitted fluorescent light.

2.2 The Utility of Introducing Quantitative Rigor Into Observations of Macroscopically Sized Specimens The present and related inventions will generally be seen to be directed to a common goal of imparting the imaging, and photographing, of macroscopic specimens (especially specimens as are caused to fluoresce)—a process generally presently conducted "ad hoc"—with a great deal of scientific rigor.

As of present, circa 2004, the images, or photographs produced by conventional illumination and observation of macroscopically-sized specimens, such as the biological specimen of a mouse, tend to be rather crude. Most typically the mouse will be illuminated so that an region of interest, such as a tumor, previously absorbing fluorescent dye will be caused to fluoresce, and the fluorescent region of the resulting image is indicated only that the mouse has the tumor.

In this rudimentary observation many, many things are lacking.

First, it is not possible to view the mouse specimen along multiple axis, or panoramically around a broad angular field, at the same time. This precludes looking at the same tumor in the mouse from two or more different directions, and from looking at multiple tumors as may exist within different regions of the mouse all at the same time.

Accordingly, it would firstly be useful if a single macroscopically-sized specimen, for example a mouse, could be observed along each of multiple axis, for example left side and right side and fore and aft, all at the same time.

Second, no dimensional scale, either linear or grid, typically accompanies the viewed image of the specimen (the mouse). Such a scale is useful for, by way of example, judging the dimension(s) and volume of the observed tumor. Accordingly, it would secondly be useful if the image of a specimen (for example, a mouse) inherently contained a scale of either the linear or the grid type.

Third, the illumination is commonly so as to induced fluorescence of a single fluorescing agent at a single color at a single time. Even though a resulting image of specimen, which is normally preserved as a photograph, may be in color, for example of a green fluorescing region within a white mouth, the image, and photograph, really contains no more information than a black and white photograph. This simplistic observation obviates the possibility that a single specimen should contain multiple fluorescing agents which fluoresce at different colors so as to identify corresponding regions of interest within the (single) specimen. This simplistic observation does not make optimal use of modern color digital cameras.

Although multi-color photographs of multiple fluorescent colors within a single specimen may in the past have been made, any such images would likely have been derived by illumination with a single light sufficient so as to induce emission in each of multiple fluorescent agents. Otherwise the "plumbing" of excitation lights to the specimen may become unwieldy. To the best knowledge of the inventor, it has not been commonly thought to simultaneously illuminate a macroscopic specimen with multiple colors (as are targeted to induce associated multiple fluorescent emissions), let alone to attempt adjustment of the intensity of each color within a resulting composite image.

In other words, a body impregnated with fluorescent red dye may appear to fluoresce red light quite brightly while another body (or the same body or portion thereof as may have picked up green fluorescent dye at a different time and/or to a different extent) may, under the same common illumination, fluoresce green light quite dimly. Nonetheless that the body, or tumor, fluorescing red shows brightly in the image, and the body, or tumor, fluorescing green shows but dimly in the image, the "green" tumor or stage may be of equal size and/or interest to the "red" tumor. What looks bright, and what looks dim, in the composite image is, of course, a function of the efficiency of the uptake of the fluorescent dyes, the efficiency of the illumination excitation of each, and the efficiency of each dye to fluoresce, among other factors. Thus, even should multiple illumination sources of different frequencies be simultaneously "optically plumbed" to illuminate the macroscopic body under observation, independently adjusting selecting illumination frequencies and adjusting the intensity of each so that the resulting "red" tumor and "green" tumor images in the composite are somewhat comparable.

Accordingly, it would thirdly be useful if each of multiple regions fluorescing at different colors within a single composite image of a specimen (for example, a mouse) could be independently adjusted in intensity, clearly rendering visible in the composite image those things and/or regions that the researcher and image taker desires to be well seen, while suppressing within the composite image other things and/or regions that are deemed unimportant. It would be especially useful if this selective differential "highlighting" of each of multiple colors of fluorescent emission could somehow be realized from but a single, common, illuminating light source.

Some little thought will reveal, however, that should such control be given to the image maker, then it may soon become impossible to know what has been done in manipulation of the composite image and its colors, and to know what imaged things and/or regions "really" look like under normal conditions. It thus, fourth, problematic that no scale of the intensity(ies) of (potentially several different) fluorescent emission(s) typically accompanies the viewed image of the specimen (the mouse). Such a scale is useful for, by way of example, judging how bright or how dim were things and/or regions—nonetheless to their appearance within the composite image—under normal, and standard, illumination conditions.

Accordingly, it would fourthly be useful if the image of a specimen (for example, a mouse) inherently contained a scale of by which any of the intensity(ies), color(s), or, as even more exotic criteria seldom useful, radiation temperature. The color scale might be broken down into hue, chroma (purity, or saturation) and brightness (value). In this manner a viewer of a composite image might be able to say: "I see by comparison to a scale that is within the selfsame image that this clearly visible first object (or area) fluoresced red, and that it was in fact quite bright, even to the point of obscuration, until intentionally diminished in intensity. Meanwhile I also see by comparison to another portion of the same scale, or another scale also contained within the image, that this equally clearly visible second object (or area) fluoresced green, but only dimly so, and that this second object has intentionally been accentuated in intensity by action of the image maker."

SUMMARY OF THE INVENTION

The present and related inventions generally contemplate imparting scientific rigor to the imaging, and photographing, of macroscopic specimens, especially such specimens as are caused to fluoresce, and to fluoresce in multiple colors. In accordance with related inventions this composite, multi-colored image of the specimen may be along multiple axis, or even panoramic.

In accordance with the present invention, sophisticated, multi-color (i.e., multi-wavelength and multi-frequency) illumination along each of multiple, for example four, axis is efficiently simultaneously realized. Moreover, this multi-colored multi-axial, or even panoramic, illumination is adjustable in the intensity (and, less often, the color (i.e. wavelength, or frequency) of each of its several colors), and is normally independently so adjustable in intensity (or color) along each axis.

The adjustment of illuminations is to the end of producing a composite, normally multi-axial or panoramic, color image, where all color fields showing induced fluorescent emissions in the specimen are simultaneously clearly visible. Nonetheless that adjustment of illumination intensity (and/or color) is being adjusted at, permissively, each of multiple colors along each of multiple axis so as to correspondingly adjust the intensity of fluorescent emissions appearing in different regions of a composite specimen image, the adjusted emissions are quantified, and calibrated.

The reason that so much illumination (and corresponding fluorescent emission) control is desired in the imaging of a Macroscopic specimen such as a mouse is as follows. By way of a simplistic illustration, an image of, by way of example, a mouse having several tumors may show several regions along each view, or viewing axis, each of which regions fluoresces at one of several corresponding different colors, and intensities. (Alternatively, one tumor can be differently dyed a different stages of development so as to fluoresce at associated different colors, and intensities.)

But for operation of the present invention, some of these various fluorescent fields within the composite, multi-colored image will tend to be so much brighter than the colors of other fields that "bright" regions of the image will "swamp" dimmer regions, and colors, of the composite image nonetheless that these dimmer regions may show information quite as important, and as valuable to the researcher, as that information shown within "bright" image portions.

In accordance with the present invention, the multiple colored fields of a composite specimen image are made to be both "balanced" and "calibratable". This is true nonetheless that the tumors of the mouse (1a) are not all effectively illuminated, and stimulated to fluorescent emission, along a single axis, nor, once stimulated, (1b) suitably viewed along a single axis, while (2) the fluorescing tumors differ greatly in intrinsic brightness. In the "balanced" image all the several tumors, or tumor stages, of the mouse will be clearly seen—even if one color of fluorescent emission is effectively enhanced, while another color of fluorescent emission is effectively attenuated, in intensity.

Moreover, and nonetheless to being "balanced", the composite color image will still be calibratable in its several colors and regions. This permits, for example, that one tumor (or tumor stage) can fluoresce in one color to one degree of brightness while another tumor (or tumor stage) can fluoresce in another color to another, potentially greatly different, degree of brightness nonetheless that both tumors will appear substantially equivalently "bright" in the composite image.

Still further in accordance with the present invention, this multi-axial, multi-color, multi-intensity illumination is accomplished efficiently, and from a reduced number of light sources by use of special "bifurcated" fiber optic cables.

The extended, expanded, and efficient (1) "optical plumbing" and (2) illumination control of the present invention is, in concert with the related inventions, directed to the production an extended, expanded and information-rich color composite image that is significantly improved over the quite simplistic images of the prior art. The apparatus, and methods, of the present and related inventions support of using the full power of a color digital camera, or image digitizer, including as may be connected to a computer.

1. The Basis of the Present Invention

The basis of the apparatus, and methods, of a first aspect of the present invention is a "bifurcated" fiber optic cable of special construction. More precisely, the basis of the invention is a special fiber optic cable made from (1) a first bifurcated fiber optic cable—for example a cable where radiation received at one end is split so as to be emitted at each of two ends—that is physically and optically merged with (2) a second bifurcated fiber optic cable—being yet another, second, fiber optic cable that is itself split so that radiation received at one end is split so as to be emitted at each of two ends.

In this physical and optical "merging", the first, or illumination radiation-receiving, or "input" cable ends of the two bifurcated fiber optic cables are preserved distinct; 1 end+1 end=2 ends. Namely, in one preferred embodiment of the special fiber optic cable there exist two input ends into which illuminating radiation is received.

However, in this same physical and optical "merging" of two bifurcated fiber optic cables, the second, or illumination radiation-emitting, or "output" ends of the two bifurcated fiber optic cables are consolidated, meaning 2 ends+2 ends are consolidated into 2 ends.

These second, or illumination radiation-emitting, or "output" ends of the special fiber optic cable are particularly so consolidated so that the radiations received at the other, "input" ends are thoroughly mixed and randomized when emitted. Such a special fiber optic cable made from a multiplicity of fiber optic stands serves to mix the illuminating color radiations received at its multiple inputs (2 such in the preferred embodiments) so that all color radiations appear at each of multiple outputs (either 2, or even 4, such outputs in the preferred embodiments). According to the (1) mixing and (2) randomizing of the transmitted radiation, the special fiber optic cable is of special construction, and must be "laid up" with due care to the routing of all contained fiber optic strands.

In a first preferred embodiment of the special "bifurcated" cable two cable inputs are routed to two cable outputs. Since the number of (2) outputs equals the number of inputs (2), such a cable might not be considered "bifurcated" at all save for the following explanation, wherein it will be seen that there is a "crossover" between each of the two inputs and the two outputs in a manner characteristic of a bifurcated cable.

Considering first the outputs, a first large number of fiber optic strands all terminating at one of their ends in a first one of two "outputs" to the special "bifurcated" cable—are merged with a second large number of fiber optic strands—likewise all terminating at one of their ends in a second one of the two "outputs" to the special "bifurcated" cable. Simply said, each of the two outputs to the special "bifurcated" cable contains fiber optic strands from the first large number of such strands, and also fiber optic strands from the second large number of such strands.

Preferably the number of fiber optic strands from the first large number of such strands, and also from the second large number or such strands, are equal, or nearly so (within 10%).

Further preferably, the fiber optic strands from both the first large number of strands, and from the second large number of strands, are thoroughly intermixed in a random or pseudo-random fashion so that the any areal portion of either of the two outputs will contain the same, or roughly the same, number of fiber optic strands from each large number of such strands.

Still further, this number of fiber optic strands per areal portion will be the same, or roughly the same (within 10%), within the total area of each output of the special "bifurcated" cable, and also between equivalent output areas of each areal portion of each of the two "outputs" to the special "bifurcated" cable.

Considering next the inputs, the first large number of fiber optic strands all terminate at their remaining ends in a first one of two "inputs" to the special "bifurcated" cable while the second large number of fiber optic strands all terminate at their remaining ends in a second one of two "inputs" to the special "bifurcated" cable.

The (two) inputs are thus separate, the (two) outputs intermixed. This is why the special cable is spoken of as being "bifurcated": each cable input is split into each of the two cable outputs.

In another, second, preferred embodiment of the special "bifurcated" cable two cable inputs are routed to four cable outputs. As might be imagined, this routing of radiation is realized by the physical routing of large numbers of fiber optic stands within the cable. Similarly to the first embodiment, the number of stands in each of the two cable inputs is the same or nearly so (within 10%), and these strands from each these inputs are equally, or nearly equally, divided among and between the four outputs. Further similarly to the first embodiment, the strands from the first input, and those from the second input, are randomized (or pseudo-randomized) in their areal positions in each of the four outputs, and between the four outputs. This means that any part or portion of any of the four outputs to the special cable will have equal, or roughly equal, numbers of fiber optic strands connecting to each of the two inputs to the same special cable.

The language of the preceding paragraphs of this section 1., while certainly describing a fiber optic cable of special construction, has served only to definitively state that, in its most preferred embodiments, such a special cable is of regular, and balanced, and symmetrical construction. The reader may wonder if the special "bifurcated" fiber optic cable could be otherwise. It can. By routing of the contained fiber optic strands it is clearly possible to construct a special cable that, by way of example, brings more received radiation(s) to one output than another, or that brings relatively more of a received radiation(s) of one color to any or to all outputs than radiation(s) of another color. These "non-symmetrical" "bifurcated" fiber optic cables are also contemplated by the present invention, and the sophisticated specimen lighting that may be obtained with such will become clearer upon study of the preferred embodiments of the preferred special "bifurcated" fiber optic cable within the DESCRIPTION OF THE PREFERRED EMBODIMENT section of this specification.

2. Use of the Special "Bifurcated" Cables of the Invention

Clearly the special "bifurcated" cables described have groups of optic fibers that jointly terminate altogether at the output ends of the cable, and that bunch together at the opposite, or input, ends of the same special "bifurcated" cable. It may alternatively be considered that the large number of fiber optic strands that are grouped at each input end of the special "bifurcated" fiber optic cable are split and divided during their connection to the output ends of the same cable, with some of the fiber optic strands going to each one of the two, or of the four, "split" ends of the special "bifurcated" cable. Normally the fiber optic strands are so "split" equally, with an equal number being routed to each output end of special "bifurcated" cable.

Both embodiments of the special "bifurcated" cable will be seen to be used in different embodiments of the larger illumination and imaging apparatus or the present and related inventions. In all embodiments the special "bifurcated" fiber optic cable (1) receives radiation of separate intensity and/or frequency (color) at each of its two input ends, and (2) serves to combine these received radiations into a single illuminating beam output from each output end of the cable. In embodiments of the apparatus using the first embodiment of the special "bifurcated" fiber optic cable having two inputs and two outputs, the illuminating radiation from each of the two outputs is used along a respective one of two illuminating (and viewing) axis. In embodiments of the apparatus using the second embodiment of the special "bifurcated" fiber optic cable with two inputs and four outputs, illuminating radiation from each of the four outputs is used along a respective one of four illuminating (and viewing) axis.

3. Relation of the Present Invention to the Invention of the Related Patent Applications In the present invention a macroscopically-sized specimen is illuminated along each of multiple axis with radiations of selectable intensities and frequencies so as to support viewing, normally of multiple colors of induced fluorescence, along a single viewing axis. A stage supports specimen to be observed. First and second illumination sources provide respective first and second radiations at selectively predetermined intensities and frequencies. The special "bifurcated" fiber optic cable discussed above receives the first radiation into a first one of at least two input ends, and the second radiation into a second one of the at least two input ends, and produces at each of at least two output ends illuminating beams in which both the first and the second radiations are present.

As a separate, and second, aspect of the present invention the intensities, and optionally also the frequencies (colors), of these illuminating radiations are controllable so that excitation of multiple different fluorescent agents, and differently fluorescing regions, within a biological specimen such as, by way of example, a tumorous mouse, may be well balanced, with fluorescence of all colors clearly visible.

In the first related patent application for ILLUMINATING AND PANORAMICALLY VIEWING A MACROSCOPICALLY-SIZED SPECIMEN ALONG A SINGLE VIEWING AXIS AT A SINGLE TIME, simultaneous illumination along each of multiple axis for panoramic viewing of a macroscopically-sized specimen such as a mouse along a single viewing axis is realized by use of dichroic mirrors. The selective control of the illumination intensity and/or color(s) of, permissively, each of multiple illuminating lights along each of multiple illumination axis that is particularly taught within the present specification permits that different regions and phenomena, such as tumors, of the specimen as are induced to fluoresce at corresponding different colors and intensities will all appear clearly visible, and well balanced, in a composite image nonetheless to intrinsically being of greatly differing brightness.

In a second related patent application for FLUORESCENT IMAGE CALIBRATION STEP WEDGE, AND USE THEREOF IN ILLUMINATION FOR FLUORESCENT IMAGING AND AUTOMATIC EXPOSURE it is taught that both color and intensity calibration of the well-balanced composite image in all its (intensity-adjusted) colors and all its regions may optionally be realized by one or more fluorescent image calibration step wedges. A rule, or grid, scale may also be imposed upon the image by use of one or more masks. The resulting panoramic composite image contains a great deal of quantitative information, being optionally calibrated in any of dimension, scale, overall brightness, color temperature and/or the separate intensities of, permissively, each of several separate differently-colored fluorescent emissions.

4. An Apparatus for Illuminating a Macroscopically-sized Specimen for Observation Along a Single Viewing Axis with Radiation of Multiple Frequencies Therefor, in one of its aspects the present invention is embodied in an apparatus for illuminating a macroscopically-sized specimen for observation along a viewing axis with radiation of multiple colors (i.e., wavelengths, or frequencies).

In one, preferred, embodiment of the apparatus for illuminating the macroscopically-sized specimen for observation along a viewing axis the apparatus has a stage for supporting a specimen to be observed, a first illumination source of first radiation of a first color, and a second illumination source of second radiation of a second color, different from the first color.

A multiple-end fiber optic cable having at least two input and at least two output ends receives the first radiation into a first one of the at least two input ends and the second radiation into a second one of the at least two input ends. This fiber optic cable produces at each of its at least two output ends both the first radiation and the second radiation so as to illuminate the specimen supported upon the stage, permitting that the specimen may be observed along the viewing axis.

The fiber optic cable preferably includes a first number of fiber optic strands receiving the first radiation at the first one of the at least two input ends, and a second number of fiber optic strands receiving the first radiation at the second one of the at least two input ends. The first number of fiber optic strands are substantially interspersed with the second number of fiber optic strands within the fiber optic cable, and vice versa, so that the radiation output at each of the at least two output ends of the fiber optic cable is substantially everywhere a combination of the first radiation and the second radiation.

The apparatus may particularly be used to observe a specimen that is fluorescent in selective regions responsive to both the first radiation and the second radiation. When so used the apparatus includes a dichroic mirror, located between each of the at least two output ends of the fiber optic cable and the specimen, so that at least some emission of fluorescent radiation induced in the specimen by each of the first radiation and the second radiation will be reflected by the dichroic mirror into an optical path that includes the viewing axis.

When so used in observing a specimen that fluoresces in a third color in selective regions responsively to the first radiation of the first color, the apparatus preferably still further includes (1) a first sensor sensing induced fluorescent radiation emission of the third color to produce a first signal, and (2) a first control circuit, responsive to the first signal, for controlling the first-color first radiation output of the radiation source. This radiation output is so controlled so that it is relatively greater when the induced fluorescent radiation emission of the third color is sensed by the first sensor to be relatively less, and is relatively lesser when the induced fluorescent radiation emission of the third color is sensed by the first sensor to be relatively greater.

The apparatus may be simultaneously used in observing a specimen that fluoresces in a fourth color in selective regions responsively to the second radiation of the second color. In this case the apparatus likewise further includes (1) a second sensor sensing induced fluorescent radiation emission of the fourth color to produce a second signal, and (2) a second control circuit, responsive to the second signal, for controlling the second-color second radiation output of the radiation source. This second-color second radiation output is so controlled so that it is relatively greater when the induced fluorescent radiation emission of the fourth color is sensed by the second sensor to be relatively less, and is relatively lesser when the induced fluorescent radiation emission of the fourth color is sensed by the second sensor to be relatively greater.

The apparatus for inducing controlled radiation outputs to induce fluorescence in at least two colors preferably still further includes a means for adjusting the balance between, on the one hand, the first sensor and first control circuit and, on the other hand, the second sensor and second control circuit, so that the induced fluorescent emission of the third color is of approximately equal intensity to the induced fluorescent emission of the fourth color.

The first illumination source of the apparatus preferably consists of a first source of radiation of more than just the first color, and a first passband filter, located between the first source of radiation and the first one of the at least two input ends of the fiber optic cable, for passing radiation of the first color from the source of radiation into the first one of the at least two input ends of the fiber optic cable. Likewise, the second illumination source preferably consists of a second source of radiation of more than just the second color, and a second passband filter, located between the second source of radiation and the second one of the at least two input ends of the fiber optic cable, for passing radiation of the second color from the source of radiation into the second one of the at least two input ends of the fiber optic cable.

The first illumination source may still further include a neutral density filter between the first source of radiation and the first one of the at least two input ends of the fiber optic cable, and/or an aperture filter between the first source of radiation and the first one of the at least two input ends of the fiber optic cable.

In an aperture filter is used, it is preferably realized as a selectively occludable aperture within an opaque object, operated so that relatively more radiation from the first source of radiation passes to the first one of the at least two ends of the fiber optic cable when the aperture is opened and relatively less radiation from the first source of radiation passes to the first one of the at least two ends of the fiber optic cable when the aperture is closed.

5. A Method for Illuminating a Macroscopically-sized Specimen for Observation Along a Single Viewing Axis with Radiation of Multiple Frequencies The present invention may alternatively be considered to be embodied in a method for illuminating a macroscopically-sized specimen for observation along a viewing axis with radiation of multiple frequencies.

In the preferred method a macroscopically-sized specimen is illuminated for observation along a viewing axis by (1) supporting upon stage the specimen to be observed, (2) first illuminating with first radiation of a first frequency a first one of at least two input ends of a fiber optic cable, and second illuminating with second radiation of a second frequency, different than the first frequency, a second one of at least two input ends of the fiber optic cable so that, in at least one output end of the fiber optic cable, is produced both the first-frequency first radiation and also the second-frequency second radiation, and (3) illuminating the specimen supported upon the stage with this combined first-frequency first radiation and also the second-frequency second radiation from a single fiber optic cable end so that the specimen can be observed, as illuminated, along the viewing axis.

The method is preferably applied to illuminating a specimen that is fluorescent to emit various radiations from various selective regions responsive to both the first radiation and the second radiation. In this application the method preferably further includes reflecting with a dichroic mirror, located between the at least one output end of the bifurcated fiber optic cable and the specimen, at least some fluorescent radiations that are emitted by the specimen responsively to each of the first radiation and the second radiation into an optical path that includes the viewing axis.

The method may be applied to illuminating a fluoresces in a first color in selective regions responsively to the first radiation of the first frequency. The method then further preferably includes sensing induced fluorescent radiation emission of the first color to produce a signal; and controlling in response to the signal the first-frequency first radiation so that this first radiation is relatively greater when the induced fluorescent radiation emission of the first color is sensed to be relatively less, and so that this first radiation is relatively lesser when the induced fluorescent radiation emission of the first color is sensed to be relatively greater.

The first illuminating with first radiation of a first frequency the first one of at least two input ends of a fiber optic cable is preferably realized by producing radiation including radiation of the first and the second frequencies in a radiation source, and filtering with a first passband filter, located between the radiation source and the first one of the at least two ends of the fiber optic cable, radiation from the radiation source so that radiation of the first frequency is passed into the first one of the at least two input ends of the fiber optic cable.

Likewise, the second illuminating with second radiation of a second frequency the a second one of the at least two ends of the fiber optic cable is preferably realized by filtering with a second passband filter, located between the radiation source and the second one of the at least two ends of the fiber optic cable, radiation from the radiation source so that radiation of the second frequency is passed into the second one of the at least two input ends of the fiber optic cable.

At least one of (1) the first illuminating with first radiation of a first frequency the first one of the at least two input ends of a bifurcated fiber optic cable, and (2) the second illuminating with second radiation of a second frequency the second one of the at least two input ends of a fiber optic cable, preferably further includes filtering. The filtering may be of all radiation that is passed into an associated one of the at least two input ends of the bifurcated fiber optic cable by use of an neutral density filter. The filtering may alternatively, or additionally, be of all radiation that is passed into an associated one of the at least two input ends of the bifurcated fiber optic cable by use of an aperture filter. The filtering with the aperture filter preferably transpires by selectively occluding with a variable size aperture within a plate radiation passing to an associated input end of the fiber optic cable so that relatively more radiation passes to this associated input end of the fiber optic cable when the aperture is opened, and so that relatively less radiation passes to this associated input end of the fiber optic cable when the aperture is closed.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2a is a diagram of a first preferred embodiment of a special "bifurcated" fiber optic cable in accordance with the present invention, and FIG. 2b is a diagram of a second preferred embodiment of the special "bifurcated" fiber optic cable in accordance with the present invention.

FIG. 3a is a diagram of a portion of the illumination optical path where an optional variable intensity control filter is realized by a rotatable wheel having an aperture, and FIG. 3b is a diagram of the same portion of the illumination optical path where the optional variable intensity control filter is realized by a sliding window, of door.

DESCRIPTION OF THE PREFERRED EMBODIMENT

Figure 1:
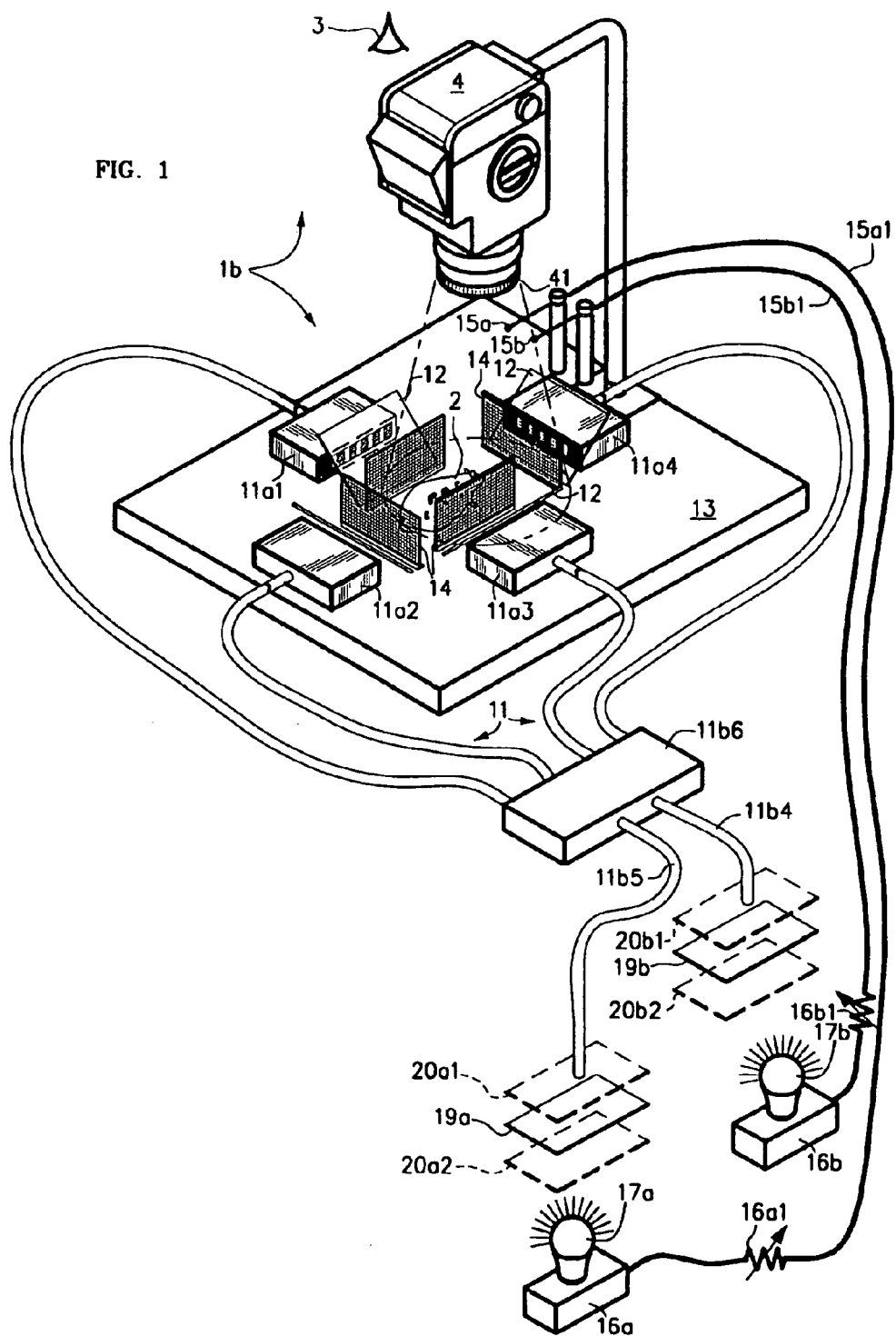
FIG. 1 is a diagrammatic view of a basic, rudimentary, illumination and viewing apparatus in accordance with the present invention.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

In simple terms, the present and related inventions may be considered to be directed to devices, and methods, that serve to replace a simple image, or "snapshot", of a macroscopically-sized specimen—for example a mouse within which multiple dyed bodies separately fluoresce, and where the image essentially shows only that the mouse possesses the (several) dyed bodies—with a sophisticated image where the (i) intensities and (ii) frequencies (colors) of fields appearing within the (composite) image may be precisely known. For example a first tumor of the mouse, seen along a first viewing axis, of size "$Size_A$" may be shown to fluoresce at intensity "$Intensity_A$" and frequency (color) "$Frequency_A$" while a second tumor of the mouse, seen along a separate second viewing axis, may be simultaneously shown in (the composite image) to be of size "$Size_B$" fluorescing at intensity "$Intensity_B$" and at frequency (color) "$Frequency_B$"

1. General Construction, and Function

A diagrammatic view of a first, rudimentary, embodiment of an illumination and viewing apparatus 1 in accordance with the present invention is shown in FIG. 1. A diagram of a first embodiment of a special "bifurcated" fiber optic cable 11a used in the apparatus 1 of FIG. 1 is shown in FIG. 2a.

Each illumination and viewing apparatus 1 consists of multiple illumination sources 11 illuminating a specimen 2 (not part of the present invention; shown in phantom line) through respective multiple dichroic mirrors 12. In FIG. 1 four such illumination sources 11a1, 11a2, 11a3, 11a4 are illustrated illuminating specimen 2 along four axis.

Thus multiple light beams illuminating specimen 2. The reflections of all such separate light beams as illuminate the specimen 2 from the specimen 2 are, as reflected in the dichroic mirrors 12, simultaneously visible along a viewing axis and to an observer's eyeball 3 or to a camera 4 (neither of which is part of the present invention).

The lens of camera 4 is covered with a bandpass or longpass filter 41, as is conventional. The filter 41 serves to substantially block the illuminating radiation from illumination sources 11—which radiation is otherwise always bright in the image seen by camera 4 (or eyeball 3)—while substantially passing (all) the fluorescent emissions induced by this illumination within specimen 2. For example, if the illuminating radiation was energetic blue light, and the induced fluorescence of both (1) green and (2) red colors, then the bandpass or longpass filter 41 would substantially block blue light, but would pass both green and red light. An optical objective stage, or viewing tube (not shown) may optionally be included.

At least (1) the emitting ends of the multiple illumination sources 11, (2) a cradle (not shown) for the specimen 2 (not part of the present invention), (3) the dichroic mirrors 12, and (4) the optional optical objective stage, or viewing tube (not shown), are held in alignment upon a stage, and by an instrument frame, 13—as is common in the optical instrumentation arts.

The paths of light ultimately appearing in such composite image as appears to the observer's eyeball 3, or to the camera 4, is thus as follows. Light from each of the multiple illumination sources 11 passes in part through an associated one of the dichroic mirrors 12, whereupon a portion of these passed light beams is either (1) are reflected from corresponding regions of the specimen 2, or, more commonly, (2) being absorbed induces fluorescent light emissions from selected areas of the specimen 2. Those portions of the incipient light that are reflected from each respectively illuminated region of the specimen, and/or the induced fluorescent emissions, are substantially reflected in the dichroic mirrors 12 and are directed to the observer's eyeball 3, or the camera 4.

It should also be understood in FIG. 1 that (1) there may be, and commonly is, ambient, or laboratory, lighting, and/or (2) the specimen mouse 2 may also be illuminated from above (illumination source not shown) as required or desired.

Optional filter elements 14 may be any of (1) scales or grid reticules 14a, (2) color filters 14b, and/or (3) fluorescent image calibration step wedges 14c.

In the case of a scale and/or grid reticule element 14, the element may be a clear glass plate or the like marked with a linear, and/or a reticular grid, scale. The grid reticule element 14a may alternatively be in the form of a framed screen or wire grid where parallel and/or intersecting wires or the like span a central aperture bounded by a generally rectangular frame. This scale then appears within the corresponding fields of the composite image, and provides a basis by which the image, and items such as specimen 2 and fluorescent fields appearing therein, may be sized. Notably, this scale can also be impressed upon each or any of the dichroic mirrors 12, in which case no separate scale element 14 needs be included.

The alternative, or additional, element 14 may be in the general nature of a color filter. It may be any of a passband filter of color (i.e., wavelength, or frequency), or a neutral density intensity attenuation filter, or any other type and purpose for which filters are commonly used. A filter element 14 may commonly be inserted within the optical path, as illustrated, in order to preset, or selectively preset, the intensity and/or color and/or color temperature of the composite image or—importantly—selected regions of this image. The composite image regions adjusted by each filter element are, of course, only those regions in which the filter element is within the optical path.

The element 14 may still further be a fluorescent image calibration step wedge, as is taught within the related patent application for a FLUORESCENT IMAGE CALIBRATION STEP WEDGE, AND USE THEREOF IN ILLUMINATION FOR FLUORESCENT IMAGING. Such a fluorescent image calibration step wedge element is essentially a scale by which any, and most preferably all, of the color properties of color fields appearing within the composite image may be measured. A preferred calibration step wedge element has two color scales, such as might besuit by way of example a green fluorescence and a red fluorescence. By comparison of a portion of the image, such as an image portion of a tumor that is fluorescing green, with an appropriate (green scale) portion of the fluorescent image calibration step wedge element, then the true color, intensity, etc., of this image portion may be rigorously determined.

2. Particular Construction, and Function, to Variably Illuminate with Multiple Colored Illuminating Lights Along Each of Multiple Axis The illumination and viewing apparatus 1 has thus been seen to consist (in part) of multiple illumination sources 11 illuminating a specimen 2 (not part of the present invention; shown in phantom line) through respective ones of multiple dichroic mirrors 12 so as to produce multiple light beams illuminating specimen 2. The reflections of all such separate light beams as illuminate the specimen 2 are, as reflected in the dichroic mirrors 12, simultaneously visible along a viewing axis and to an observer's eyeball 3 or to a camera 4 (neither of which is part of the present invention). An optical objective stage, or viewing tube (not shown) may optionally be included along the viewing axis.

At least (1) the emitting ends 11a-11b of the multiple illumination sources 11, (2) a cradle (not shown) for holding the specimen 2 (not part of the present invention), (3) the dichroic mirrors 12, and (4) the optional optical objective stage or viewing tube (not shown), are held in alignment upon a stage, and by an instrument frame 13—as is common in the optical instrumentation arts.

Particularly in accordance with the present invention, the multi-colored illuminations (2 colors in FIG. 1) along each of the multiple illumination axis (four such axis in FIG. 1), is provided from a reduced number of light sources (2 such light sources 17 in FIG. 1). Moreover, and separately to the innovative provision of the multi-colored lights along each of multiple axis, these lights are separately independently adjustable in intensity.

In accordance with this later aspect of the present invention, one or more sensors of light intensity 15, and/or the intensity of a particular color or fluorescent emission, are located within the path of (fluorescent) light from the specimen 2, in particular between the dichroic mirrors 12, or any and each of them, and the observer's eyeball 3 or camera 4. In FIG. 1 two such sensors 15a, 15b—each of which sensors 15a, 15b senses a particular fluorescent color—are shown. The sensors 15a, 15b of (colored) light intensity 15 are typically held in position upon posts also connected to instrument frame 13, and respectively transmit signals via wires 15a1, 15b1.

The sensors of light intensity 15a, 15b are preferably photoelectric sensors filtered or tuned so as to be sensitive-to, most normally, a single expected color (i.e., wavelength, or frequency) of fluorescent emission. Each sensor 15a, 15b intercept(s) emitted fluorescent light over a sufficiently broad area of one optical path so as to detect the (cumulative, aggregate) fluorescent light emissions (if any be present).

The fluorescent emission intensity sensors 15a, 15b operate through wires 15a1, 15a2 and control circuits 16a1, 16b1 of variable power sources 16a, 16b. The control circuits 16a1, 16b1 and variable power sources 16a, 16b are of conventional construction for variably energizing, preferably, incandescent lamps. The incandescent lights are commonly filtered so as to produce the illumination colors of interest by color passband filters 19a, 19b, as is conventional. The variable power sources 16a, 16b in turn power the light sources 17a, 17b. The light sources 17a, 17b are, as stated, preferably incandescent lamps, and are more preferably 150 watt halogen lamps type EKE.

Two such variable power sources 16a, 16b are illustrated respectively powering two light sources 17a, 17b in FIG. 1. The level of each light source 17a, 17b is respectively adjustable by an associated control circuit 16a1, 16b1, each illustrated as a variable resistor. The control circuits 16a1, 16b1 may be on the order of a preset, wherein the general intensity, or level, of the power sources 16a, 16b and associated light source 17a, 17b is adjusted. The control may be on the order of feedback loop, as illustrated in FIG. 1, wherein the intensity of each (fluorescent) color as is detected in the path of optical emissions from specimen 2 is used to adjust the intensity of the very (colored, narrowband) light that will cause the emission of this color.

The light emissions from each of the light sources 17a, 17b is passed through a respective color filter 19a, 19b to be passed through the special, "bifurcated", fiber optic bundle 11 to be emitted at each of the light sources 11a1, 11a2, 11a3, 11a4. Within the optical path, and normally either before or after the color filters 19a, 19b are optionally located one or more optional attenuation 20a1, 20a2 or 20b1, 20b2. These elements 20a1, 20a2, 20b1, 20b2 may be any of (1) neutral density filters, (2) further color filters, and/or, as particularly besuits the construction of the special "bifurcated" fiber optic cable 11, simple mechanical mechanisms that obscure part of the light from a respective light source 17a, 17b to a respective light-receiving, or input, end 11b4, 11b5 of the special "bifurcated" fiber optic cable 11. These mechanical mechanisms are illustrated in FIGS. 3a and 3b, and are more completely discussed in section 4., following.

This control loop operates to a preset level to brighten the light 17, and the corresponding one light source 11, when the fluorescent emission is dim, and to make less bright the light 17, and the corresponding one light source 11, when the fluorescent emission is bright. Similar illumination light intensity control sensors and paths, not shown, appear on other ones of the illumination paths leading to the light sources 11.

The paths of light ultimately appearing in such composite image as appears to the observer's eyeball 3, or to the camera 4, is thus as follows. Light from each of the multiple illumination sources 11a-11d passes in part through an associated one of the dichroic mirrors 12, whereupon a portion of these passed light beams are reflected, or, more commonly, do induce colored fluorescent emissions from corresponding regions of the specimen 2. Those portion of the incipient light that are reflected from each respectively illuminated region of the specimen and, more commonly, those fluorescent emissions induced in the specimen are reflected in the dichroic mirrors 12 and are directed to the observer's eyeball 3, or the camera 4. Indeed, the dichroic mirrors 12 substantially pass the illuminating radiation, and substantially reflect the induced fluorescent radiation.

3. Embodiments of the Special "Bifurcated" Fiber Optic Cable

The first preferred embodiment of a special "bifurcated" fiber optic cable 11a in accordance with the present invention seen in FIG. 1 is shown in greater detail in FIG. 2a, and another embodiment of this special "bifurcated" fiber optic cable 11b is shown in FIG. 2b.

The fiber strands of the cables 11a, 11b may be type h09001,050, normally ii 0.300×58' bundles. After the bundles are sized, (2) 3.00×0.024" lines are pulled, In these two lines the contained optic fibers are randomized 11b6. Namely, fiber optic strands from radiation-receiving, or input, ends 11a4 and 11a5 are randomized into each of two bundles that respectively connect to radiation-emitting, or output, ends 11a1, 11a3. Half the fiber optic stands from radiation-receiving, or input, end 11a4 go to each of radiation-emitting, or output, ends 11a1 and 11a3. Meanwhile, half of the fiber optic stands from radiation-receiving, or input, end 11a5 likewise go to each of the radiation-emitting, or output, ends 11a1, 11a3. The optic fiber strands from each radiation-receiving, or input, ends 11a4, 11a5 are thoroughly and uniformly mixed in the radiation-emitting, or output, ends 11a1, 11a3.

Accordingly, half the radiation received at radiation-receiving, or input, end 11a4 goes to each of the radiation-emitting, or output, ends 11a1, 11a3; and half the radiation received at radiation-receiving, or input, end 11a5 likewise goes to each of the radiation-emitting, or output, ends 11a1, 11a3. Moreover, the received radiation is emitted relatively (within 10%) equally over the area of these radiation-emitting, or output, ends 11a1, 11a3, which are normally rectangular in shape, and which emit over an area that is commonly about 3 inches by 2 inches in size.

The second embodiment of the special "bifurcated" fiber optic cable shown in FIG. 2b functions likewise. Radiation received at each of two radiation-receiving, or input, ends 11b4, 11b5 goes to and are randomized at 11b6, and is equally distributed among, each of four radiation-emitting, or output, ends 11b1-11b4.

4. Embodiments of Mechanical mechanisms for Obscuring Part of the Light from a Light Source a Light-receiving, or Input, End of the Special "Bifurcated" Fiber Optic Cable Two embodiments of Simple mechanical mechanisms that obscure part of the light from a respective light source 17a, 17b to a respective light-receiving, or input, end 11b4, 11b5 of the special "bifurcated" fiber optic cable 11 are illustrated in FIGS. 3a and 3b.

A portion of the illumination optical path where an optional variable intensity control filter 20a1, 20a2, 20b1, 20b2 is realized by a rotatable wheel 30 having an aperture 31 is shown in FIG. 3a. As the wheel 30 is rotated relatively more, or less, light is passed from light source 17a (or 17b) in to the light-receiving, or input, end 11b5 (or 11b4) of fiber optic cable 11.

The same portion of the illumination optical path where an optional variable intensity control filter 20a1, 20a2, 20b1, 20b2 is realized by a sliding window, or door, 40 having an aperture 41 is shown in FIG. 3b. As the sliding window, or door, aperture 41 is opened or closed then relatively more, or less, light is passed from light source 17a (or 17b) in to the light-receiving, or input, end 11b5 (or 11b4) of fiber optic cable 11.

The rotatable wheel 30, or the sliding window/door 40, versions of the optional variable "intensity" control filters 20a1, 20a2, 20b1, 20b2 can also be used to selectively change the color (i.e., frequency, or wavelength) of the illuminating lights, and each of them. In this case the control filters 20a1, 20a2, 20b1, 20b2 might better be called optional variable "color" control filters 20a1, 20a2, 20b1, 20b2.

In this case the aperture 31 of the wheel 30, or the window aperture 41 of the sliding door/window 40 is replaced with a color filter. The wheel 30 is rotated, or the sliding door/window 40 is slid, by, respectively, a motor or a solenoid (not shown) under control of a color illumination sensor signal arising at color light sensors 15a, 15b (shown in FIG. 1). The color filters that are selectively physically moved into the optical paths may also be of gradient density and/or gradient color. In this, and like, manners a practitioner of the arts of illumination and intensity control will recognize that many different approaches are possible in using the sensing of a (respective) emitted fluorescent light color by the sensors 15a, 15b to control any of the intensities or colors (i.e., frequencies, or wavelengths) of the respective illuminating lights that respectively gave rise to these respective fluorescent emissions.

The gravamen of the second aspect of the present invention is not that feedback intensity, or color, control of illuminating lights is difficult, but rather that it should be done for two separate illumination light sources at the same time in order that the different, and differently colored, fluorescent light emissions induced by each may be balanced in a single composite image made and viewed at a single time.

5. Practice of the Invention

The present invention has thus been seen to be embodied in an apparatus for illuminating along multiple viewing axis a macroscopically-sized specimen for observation along a single viewing axis. The illuminating radiations may be of multiple intensity, and multiple colors (i.e., wavelengths, or frequencies).

The most preferred apparatus includes a stage for supporting a specimen to be observed, at least one first illumination source of first radiation of some first intensity and color (i.e., wavelength, or frequency), and at least one second illumination source of second radiation that differ differs from the first radiation in intensity, in color (i.e., wavelength, or frequency), or in both intensity and color. A special fiber optic cable receives the first radiation into a first one of two radiation-receiving, or input, ends and receives the second radiation into a second one of the two radiation-receiving ends. Optionally even more than two radiations can be received, and combined, by the principles of the present invention.

This same special fiber optic cable produces at each of at least two radiation-emitting, or output, ends both the first radiation and the second radiation. This combined, dual-frequency (or even multiple-frequency) radiation is used to illuminate the specimen supported upon the stage along at least two separate illumination, and viewing, axis.

The fiber optic cable preferably consists of (1) a first large number of fiber optic strands receiving the first radiation at the first one of the two radiation-receiving, or input, ends and (2) a second large number of fiber optic strands receiving the second radiation at the second one of the two radiation-receiving, or input, ends. Normally the first and second large numbers are equal, but they need not be, and may be, by way of example, in a predetermined ratio such as 2:3.

The first large number of fiber optic strands is substantially interspersed with the second large number of fiber optic strands within the special fiber optic cable, and vice versa. Moreover, an approximately equal number of total fiber optic strands are routed to each of the at least two radiation-emitting, or output, ends.

Thus, due to the interspersing of the fiber optic strands, the radiation output at each of the at least two radiation-emitting, or output, ends is a combination, normally an equal combination (at least in area of emission), of the first radiation and the second radiation. Moreover, this output of both the first and the second radiation at each of the at least two radiation-emitting, or output, ends is substantially the same (i.e, within 10%). Still further, the output of both the first and second radiation between all of the at least two radiation-emitting, or output, ends is substantially the same (i.e., within 10%).

The multi-axis specimen illumination and viewing apparatus so constructed is particularly preferred for use in observing a specimen that is fluorescent in selective regions responsive to both the first radiation and the second radiation. So used the apparatus preferably further includes a dichroic mirror located between the each output end of the special "bifurcated" fiber optic cable and the specimen. By this arrangement at least some emission of fluorescent radiation induced in the specimen by each of the first radiation and the second radiation will be reflected by the dichroic mirror into an optical path that includes the viewing axis.

The multi-axis specimen illumination and viewing apparatus preferably includes a first source of radiation of a first color (i.e., at a first wavelength, and frequency) (at a first intensity), and a second source of radiation of a second color (i.e., at a second wavelength, and frequency) (at a second intensity). The first illumination source may consist of a first passband filter located between a source of radiation and the first one of the two bifurcated ends of the bifurcated fiber optic cable. This first passband filter passes radiation of the first color (i.e., wavelength, or frequency) from the source of radiation into the first one of the two radiation-receiving, or input, ends of the special "bifurcated" fiber optic cable. Likewise, the second illumination source may consist of a second passband filter, now located between the source of radiation and the second one of the two radiation-receiving, or input, ends of the special "bifurcated" fiber optic cable. This second passband filter passes radiation of a second color (i.e., a second wavelength, or second frequency) from the source of radiation into the second one of the two radiation-receiving, or input, ends of the special "bifurcated" fiber optic cable.

Alternatively, or additionally, the source of radiation may be coupled with a neutral density filter located between a common source of radiation and either, or both, of the two radiation-receiving, or input, ends of the special "bifurcated" fiber optic cable.

Alternatively, an aperture filter may be located between the source of radiation and either, or both, or the two radiation-receiving, or input, ends of the special "bifurcated" fiber optic cable. Uniquely, due to the special construction of fiber optic cable, this aperture filter may be simply a selectively occludable aperture within a frame, much in the manner of a sliding window, or door. The selectively occludable aperture passes relatively more radiation from an illumination source to an associated radiation-emitting, or output, end of the special "bifurcated" fiber optic cable when the aperture is opened, and relatively less radiation from an illumination source to the associated output end of the special "bifurcated" fiber optic cable when the aperture is closed.

Additionally, the present invention is embodied in a method for illuminating a macroscopically-sized specimen for observation along a viewing axis with radiation of multiple colors (i.e., wavelengths, or frequencies).

In the preferred method a macroscopically-sized specimen is illuminated for observation along a viewing axis by (1) supporting upon stage a specimen to be observed, (2) first illuminating with first radiation of a first frequency a first one of two radiation-receiving, or input, ends of a special "bifurcated" fiber optic cable, and (3) second illuminating with second radiation of a second color (i.e., wavelength, or frequency), different than the first frequency, a second one of two radiation-receiving, or input, ends of the special "bifurcated" fiber optic cable, meanwhile to (4) third illuminating with both first-frequency first radiation, and also second-frequency second radiation, the specimen supported upon the stage from each of multiple radiation-emitting, or output, ends of special "bifurcated" cable, each radiation-emitting, or output, end of special "bifurcated" cable illuminating the specimen along a separate the viewing axis.

This method may in particular be applied to illuminating a specimen that is fluorescent in each of multiple colors to so as to cause the specimen to emit various, and variously colored, radiations from various selective regions. Normally induced fluorescent emissions at a first color are responsive to the first radiation, and induced fluorescent emissions at a second color are responsive to the second radiation. If an emission of any color is desired to be accentuated, or enhanced, then the intensity (or, more rarely, the color) of the associated illuminating radiation is increased (or, more rarely, made to be of a color that is more productive of the associated fluorescence). Conversely, if an emission of any color is desired to be attenuated, or diminished, then the intensity (or, more rarely, the color) of the associated illuminating radiation is decreased (or, more rarely, made to be of a color that is less productive of the associated fluorescence).

The ability to modify the relative, and regional, and axial, intensity of fluorescent emissions from the specimen, including automatically so modifying, by act of modifying the corresponding intensities and/or color of the associated relative, and regional, and axial, illuminating radiations is an important aspect of the present and related inventions.

The method preferably further includes reflecting with a dichroic mirror, located between the single end of the bifurcated fiber optic cable and the specimen, at least some of the colored fluorescent radiations that are emitted by the specimen (responsively to each of the first radiation and the second radiation) into an optical path that includes the viewing axis.

In one variant preferred method the first illuminating with first radiation of a first frequency the first one of two radiation-receiving, or input, ends of a special "bifurcated" fiber optic cable consists of: (1) producing radiation including radiation of the first and the second frequencies in a radiation source, and (2) filtering with a first passband filter, located between the radiation source and a first one of two radiation-receiving, or input, ends of a special "bifurcated" fiber optic cable, radiation received from the radiation source so that radiation of the first frequency is passed into this first one of the two radiation-receiving, or input, ends of the special bifurcated fiber optic cable. Likewise, the second illuminating with second radiation of a second frequency the second one of two radiation-receiving, or input, ends of the special "bifurcated" fiber optic cable then consists of filtering with a second passband filter, located between the radiation source and the second one of the two radiation-receiving, or input, ends of the special "bifurcated" fiber optic cable, radiation from the radiation source so that radiation of the second frequency is passed into this second one of the two radiation-receiving, or input, ends of the special "bifurcated" fiber optic cable.

Either, or both, of the first illuminating with first radiation of a first frequency the first one of two radiation-receiving, or input, ends of a special "bifurcated" fiber optic cable, and the second illuminating with second radiation of a second frequency of the second one of two radiation-receiving, or input, ends of the same special "bifurcated" fiber optic cable, may include, or also, include filtering with a neutral density filter radiation that is passed into the either, or both, radiation-receiving, or input, ends of the same special "bifurcated" fiber optic cable.

Either, or both, of the first illuminating with first radiation of a first frequency the first one of the two radiation-receiving, or input, ends of the special "bifurcated" fiber optic cable, and the second illuminating with second radiation of a second frequency the second one of the two radiation-receiving, or input, ends of the same special "bifurcated" fiber optic cable, may include filtering with an aperture filter radiation that is passed into the an associated one of the two radiation-receiving, or input, ends of the same special "bifurcated" fiber optic cable.

If the filtering is with an aperture filter, it is preferably so with an aperture filter serving to selectively occlude with a variable size aperture within a plate radiation passing to the associated radiation-receiving, or input, end of the special "bifurcated" fiber optic cable so that relatively more radiation passes to the associated ends of the special "bifurcated" fiber optic cable when this aperture is opened, and so that relatively less radiation passes to the associated radiation-emitting, or output, ends of the special "bifurcated" fiber optic cable when this aperture is closed.

6. Conclusion

In the most preferred embodiment of the present invention multi-color (or dual color) (i.e., multi-frequency, or multi-wavelength) illumination is preferably realized along each of four illumination axis (specimen left, right, front and rear as is shown in FIG. 1b) by two only lamps each of which can have its light output adjusted. The light output is commonly so adjusted by changing the (d.c.) voltage to the lamp with the light output of the lamp being proportionately changed. The light output of each lamp is then preferably projected through one or more associated color, or neutral density, filters are within optical paths leading into each of two ends of a special "bifurcated" fiber optic cable. The light outputs of two lamps—which lamps are most commonly at different intensities and also different colors (i.e., wavelengths, or frequencies) and the light in each path from each lamp which may be filtered—is thus distributed, normally equally, to, ultimately, four separate cable ends, as illustrated in FIG. 1. Use of the special "bifurcated" fiber optic cable permits of independently adjustment of the light intensity in each illumination path, and between illumination paths. Moreover, the economies of illuminating light production and distribution within the apparatus are much improved.

In accordance with the preceding explanation, variations and adaptations of the apparatus and method for illuminating and panoramically viewing a macroscopically-sized specimen along a single axis at a single time in accordance with the present invention will suggest themselves to a practitioner of the optical arts.

For example, the dichroic mirrors 12 need not be made straight, in segments to surround specimen 2, but rather one single dichroic mirror 12 in shape of a shallow bowl could be made an used to support continuous panoramic illumination and viewing.

In accordance with these and other possible variations and adaptations of the present invention, the scope of the invention should be determined in accordance with the following claims, only, and not solely in accordance with that embodiment within which the invention has been taught.

What is claimed is:

1. An apparatus for illuminating a macroscopically-sized specimen for observation along a viewing axis, the apparatus comprising:
    a stage for supporting a specimen to be observed;
    a first illumination source of first radiation of a first color;
    a second illumination source of second radiation of a second color, different from the first color;
    a multiple-end fiber optic cable having at least two input and at least two output ends, a first multiplicity of fiber optic strands receiving the first radiation into a first one of the at least two input ends and a second multiplicity of fiber optic strands receiving the second radiation into a second one of the at least two input ends;
    wherein each strand of the first and second multiplicity of fiber optic strands provides a discrete optical path, and
    wherein the first multiplicity of fiber optic strands is substantially and randomly interspersed with the second multiplicity of fiber optic strands within the multiple-end fiber optic cable, so that the radiation output at each of the at least two output ends of the fiber optic cable is substantially everywhere a combination of the first radiation and the second radiation to illuminate the specimen supported upon the stage so that the specimen may be observed along the view axis.

2. The apparatus according to claim 1 used in observing a specimen that is fluorescent in selective regions responsive to both the first radiation and the second radiation, the apparatus further comprising:
    a dichroic mirror, located between each of the at least two output ends of the fiber optic cable and the specimen, so that at least some emission of fluorescent radiation induced in the specimen by each of the first radiation and the second radiation will be reflected by the dichroic mirror into an optical path that includes the viewing axis.

3. The apparatus according to claim 1 used in observing a specimen that fluoresces in a third color in selective regions responsively to the first radiation of the first color, the apparatus further comprising:
    a first sensor sensing induced fluorescent radiation emission of the third color to produce a first signal; and
    a first control circuit, responsive to the first signal, for controlling the first-color first radiation output of the radiation source so that this radiation output is relatively greater when the induced fluorescent radiation emission of the third color is sensed by the first sensor to be relatively less, and is relatively lesser when the induced fluorescent radiation emission of the third color is sensed by the first sensor to be relatively greater.

4. The apparatus according to claim 3 used in observing a specimen that fluoresces in a fourth color in selective regions responsively to the second radiation of the second color, the apparatus further comprising:
    a second sensor sensing induced fluorescent radiation emission of the fourth color to produce a second signal; and
    a second control circuit, responsive to the second signal, for controlling the second-color second radiation output of the radiation source so that this radiation output is relatively greater when the induced fluorescent radiation emission of the fourth color is sensed by the second sensor to be relatively less, and is relatively lesser when the induced fluorescent radiation emission of the fourth color is sensed by the second sensor to be relatively greater.

5. The apparatus according to claim 4 further comprising:
    a means for adjusting the balance between, on the one hand, the first sensor and first control circuit and, on the other hand, the second sensor and second control circuit, so that the induced fluorescent emission of the third color is of approximately equal intensity to the induced fluorescent emission of the fourth color.

6. The apparatus according to claim 1 wherein the first illumination source comprises:
    a first source of radiation of more than just the first color;
    a first passband filter, located between the first source of radiation and the first one of the at least two input ends of the fiber optic cable, for passing radiation of the first color from the source of radiation into the first one of the at least two input ends of the fiber optic cable;
    and wherein the second illumination source comprises:
    a second source of radiation of more than just the second color;
    a first passband filter, located between the second source of radiation and the second one of the at least two input ends of the fiber optic cable, for passing radiation of the second color from the source of radiation into the second one of the at least two input ends of the fiber optic cable.

7. The apparatus according to claim 6 wherein the first illumination source comprises:
    a neutral density filter between the first source of radiation and the first one of the at least two input ends of the fiber optic cable.

8. The apparatus according to claim 6 wherein the first illumination source comprises:
    an aperture filter between the first source of radiation and the first one of the at least two input ends of the fiber optic cable.

9. The apparatus according to claim 8 wherein the aperture filter comprises:
    a selectively occludable aperture within an opaque object, relatively more radiation from the first source of radiation passing to the first one of the at least two ends of the fiber optic cable when the aperture is opened and relatively less radiation from the first source of radiation passing to the first one of the at least two ends of the fiber optic cable when the aperture is closed.

10. A method of illuminating a macroscopically-sized specimen for observation along a viewing axis, the method comprising:
    supporting upon stage a specimen to be observed;
    first illuminating with first radiation of a first frequency a first one of at least two input ends of a fiber optic cable a first multiplicity of fiber optic strands;
    second illuminating with second radiation of a second frequency, different than the first frequency, a second one of at least two input ends of the fiber optic a second multiplicity of fiber optic strands;

providing a discrete optical path with each strand of the first and second multiplicity of fiber optic strands, and producing in at least one output end of the fiber optic cable both the first-frequency first radiation and also the second-frequency second radiation, and illuminating the specimen supported upon the stage with this combined first-frequency first radiation and also the second-frequency second radiation from a single fiber optic cable end so that the specimen can be observed, as illuminated, along the viewing axis substantially and randomly interspersing the first multiplicity of fiber optic strands with the second multiplicity of fiber optic strands within the fiber optic cable, and vice versa, so that the radiation output at each of the at least two output ends of the fiber optic cable is substantially everywhere a combination of the first radiation and the second radiation.

11. The method according to claim 10 applied to illuminating a specimen that is fluorescent to emit various radiations from various selective regions responsive to both the first radiation and the second radiation, wherein the method further comprises:

reflecting with a dichroic mirror, located between the at lest one output end of the bifurcated fiber optic cable and the specimen, at least some fluorescent radiations that are emitted by the specimen responsively to each of the first radiation and the second radiation into an optical path that includes the viewing axis.

12. The method according to claim 10 applied to illuminating a fluoresces in a first color in selective regions responsively to the first radiation of the first frequency, the method further comprising:

sensing induced fluorescent radiation emission of the first color to produce a signal; and controlling in response to the signal the first-frequency first radiation so that this first radiation is relatively greater when the induced fluorescent radiation emission of the first color is sensed to be relatively less, and so that this first radiation is relatively lesser when the induced fluorescent radiation emission of the first color is sensed to be relatively greater.

13. The method according to claim 10 further wherein the first illuminating with first radiation of a first frequency the first one of at least two input ends of a fiber optic cable comprises:

producing radiation including radiation of the first and the second frequencies in a radiation source; and filtering with a first passband filter, located between the radiation source and the first one of the at least two ends of the fiber optic cable, radiation from the radiation source so that radiation of the first frequency is passed into the first one of the at least two input ends of the fiber optic cable;

and wherein the second illuminating with second radiation of a second frequency the a second one of the at least two ends of the fiber optic cable comprises:

filtering with a second passband filter, located between the radiation source and the second one of the at least two ends of the fiber optic cable, radiation from the radiation source so that radiation of the second frequency is passed into the second one of the at least two input ends of the fiber optic cable.

14. The method according to claim 11 wherein at least one of the first illuminating with first radiation of a first frequency the first one of the at least two input ends of a bifurcated fiber optic cable, and the the second illuminating with second radiation of a second frequency the second one of the at least two input ends of a bifurcated fiber optic cable, further comprises:

filtering with a neutral density filter all radiation that is passed into an associated one of the at least two input ends of the bifurcated fiber optic cable.

15. The method according to claim 11 wherein at least one of the first illuminating with first radiation of a first frequency the first one of the at least two input ends of a bifurcated fiber optic cable, and the the second illuminating with second radiation of a second frequency the second one of the at least two input ends of a bifurcated fiber optic cable, further comprises:

filtering with an aperture filter all radiation that is passed into an associated one of the at least two input ends of the bifurcated fiber optic cable.

16. The method according to claim 15 wherein the filtering with an aperture filter comprises:

selectively occluding with a variable size aperture within a plate radiation passing to an associated input end of the fiber optic cable so that relatively more radiation passes to this associated input end of the fiber optic cable when the aperture is opened, and so that relatively less radiation passes to this associated input end of the fiber optic cable when the aperture is closed.

17. An apparatus for illuminating a macroscopically-sized specimen for observation along a viewing axis, the apparatus comprising:

a stage for supporting a specimen to be observed;

a first illumination source of first radiation of a first color;

a second illumination source of second radiation of a second color, different from the first color;

a fiber optic cable receiving the first radiation into a first multiplicity of fiber optic strands one of two radiation-receiving, or input, ends and receiving the second radiation into a second multiplicity of fiber optic strands one of the two radiation-receiving ends, wherein each strand of the first and second multiplicity of fiber optic strands provides a discrete optical path, and, responsively to the receiving, producing at each of the at least two radiation-emitting, or output, ends both the first radiation and the second radiation;

wherein a combined, dual-color, radiation produced at each of the at least two radiation-emitting, or output, ends of the fiber optic cable is used to illuminate the specimen supported upon the stage along at least two separate illumination, and viewing axis wherein the first multiplicity of fiber optic strands is substantially and randomly interspersed with the second multiplicity of fiber optic strands within the fiber optic cable, and vice versa, so that the radiation output at each of the at least two output ends of the fiber optic cable is substantially everywhere a combination of the first radiation and the second radiation.

18. The apparatus according to claim 17 used in observing a specimen that is fluorescent in selective regions responsive to both the first radiation and the second radiation, the apparatus further comprising:

a dichroic mirror, located between the end of the fiber optic cable and the specimen, so that at least some emission of fluorescent radiation induced in the specimen by each of the first radiation and the second radiation will be reflected by the dichroic mirror into an optical path that includes the viewing axis.

19. A method of illuminating a macroscopically-sized specimen for observation along a viewing axis, the method comprising:
- supporting upon stage a specimen to be observed;
- first illuminating with first radiation of a first color a first one of two radiation-receiving, or input, ends of the fiber optic cable a first multiplicity of fiber optic strands;
- second illuminating with second radiation of a second color, different than the first color, a second one of two radiation-receiving, or input, ends of the fiber optic cable a second multiplicity of fiber optic strands;
- substantially and randomly interspersing the first and second multiplicity of fiber optic strands;
- providing a discrete optical path with each strand of the first and second multiplicity of fiber optic strands, and
- third illuminating with both first-frequency first radiation, and also second-frequency second radiation, from each of at least two radiation-emitting, or output, ends of the fiber optic cable a specimen supported upon the stage so that the specimen can be observed, as illuminated, along a single viewing axis.

20. The method according to claim 19 applied to illuminating a specimen that is fluorescent to emit various radiations from various selective regions responsive to both the first radiation and the second radiation, wherein the method further comprises:
- reflecting with a dichroic mirror, located between the single end of the bifurcated fiber optic cable and the specimen, at least some fluorescent radiations that are emitted by the specimen responsively to the third illuminating into an optical path that includes the viewing axis.

21. The method according to claim 19 further wherein the first illuminating with first radiation of a first frequency the first one of two radiation-receiving, or input, ends of a fiber optic cable comprises:
- producing radiation including radiation of the first and the second color in a radiation source; and
- filtering with a first passband filter, located between the radiation source and the first one of the two radiation-receiving, or input, ends of a fiber optic cable, radiation from the radiation source so that radiation of the first color is passed into this first one of the two radiation-receiving, or input, ends of the fiber optic cable; and
- filtering with a second passband filter, located between the radiation source and the second one of the two radiation-receiving, or input, ends of a fiber optic cable, radiation from the radiation source so that radiation of the second color is passed into this second one of the two radiation-receiving, or input, ends of the fiber optic cable.

22. The apparatus according to claim 1 for illuminating a macroscopically-sized specimen for viewing wherein:
- the first illumination source of the first radiation is sufficient to induce fluorescent emission of the first color in the specimen;
- the second illumination source of the second radiation is sufficient to induce fluorescent emission of the second color in the specimen;
- so that fluorescent emissions in at least the first and second colors are induced in the specimen; and
- wherein the apparatus further comprises a first sensor sensing induced fluorescent radiation emissions of the first color to produce a first signal;
- a second sensor sensing induced fluorescent radiation emissions of the second color to produce a second signal;
- a first control circuit, responsive to the first signal, for controlling the first radiation output of the first illumination source so that this first radiation output is relatively greater when the induced fluorescent radiation emission of the first color is sensed by the first sensor to be relatively less, and is relatively lesser when the induced fluorescent radiation emission of the first color is sensed by the first sensor to be relatively greater; and
- a second control circuit, responsive to the second signal, for controlling the second radiation output of the second illumination source so that this second radiation output is relatively greater when the induced fluorescent radiation emission of the second color is sensed by the second sensor relatively less, and is relatively lesser when the induced fluorescent radiation emission of the second color is sensed by the second sensor to be relatively greater.

23. The apparatus according to claim 22 wherein the at least one light conduit comprises:
- a multiple-end fiber optic cable having at least two input and at least two output ends, receiving the first radiation into a first one of the at least two input ends sod receiving the second radiation into a second one of the at least two input ends, producing at each of the at least two output ends both the first radiation and the second radiation so as to illuminate the specimen supported upon the stage.

24. The apparatus according to claim 22 further comprising: a circuit means for adjusting a balance between the first control circuit and the second control circuit so that induced fluorescent emissions of the first color from the specimen are commensurate in viewed intensity with induced fluorescent emissions of the second color from the specimen.

* * * * *